United States Patent
Bartsch et al.

[11] Patent Number: 5,573,580
[45] Date of Patent: Nov. 12, 1996

[54] BLACK WASH FOR PRODUCING MOULD COATINGS

[75] Inventors: Dietmar Bartsch, Laatzen; Klaus Seeger, Hanover; Hans-Dieter Kaiser, Burgdorf, all of Germany

[73] Assignee: Huttenes-Albertus Chemische Werke GmbH, Germany

[21] Appl. No.: 362,523

[22] PCT Filed: May 17, 1994

[86] PCT No.: PCT/DE94/00555

§ 371 Date: Jan. 5, 1995

§ 102(e) Date: Jan. 5, 1995

[87] PCT Pub. No.: WO94/26440

PCT Pub. Date: Nov. 24, 1994

[30] Foreign Application Priority Data

May 17, 1993 [DE] Germany ............ 93 07 468.9 U

[51] Int. Cl.$^6$ ..................................... B28B 7/36
[52] U.S. Cl. ................... 106/38.27; 106/38.22; 501/80; 501/87; 501/88; 501/95; 501/96; 501/99
[58] Field of Search ............... 106/38.22, 38.27, 106/38.23; 501/80, 88, 87, 95, 96, 99

[56] References Cited

U.S. PATENT DOCUMENTS

| | | | |
|---|---|---|---|
| 3,804,701 | 4/1974 | Bognar | 106/38.22 |
| 4,012,262 | 3/1977 | Patterson et al. | 106/38.22 |
| 4,174,331 | 11/1979 | Myles | 106/38.23 |
| 4,332,618 | 6/1982 | Ballard | 501/21 |
| 4,950,627 | 8/1990 | Tokarz et al. | 106/602 |

*Primary Examiner*—Mark L. Bell
*Assistant Examiner*—Michael Marcheschi
*Attorney, Agent, or Firm*—Dominik & Stein

[57] ABSTRACT

A founder's black for producing mould coatings is disclosed, whose main component consists of finely ground refractory to highly refractory inorganic materials. The black wash contains 1 to 40% by weight inorganic hollow spheres, in relation to the ready-to-use black wash. It may further contain 0.1 to 10% by weight of inorganic or organic fibers, in relation to the ready-to-use mould coating. The hollow spheres are preferably filled with an inert gas. They may consist of oxides such as aluminium oxide, quartz, magnesite, mullite, chromite, zircon oxide and/or titanium oxide, or borides, carbides and nitride such as silicium carbide, titanium carbide, or carbon, glass or metals, or mixtures thereof. The fibres have 1 to 30 μm diameter, preferably 3 to 10 μm and 10 to 5000 μm length, preferably 100 to 500 μm length. When the fibres are inorganic, they may consist of aluminum silicates, aluminum oxide, zircon oxide, titanium oxide, carbon, silinium carbide, titanium carbide, titanium boride, boron nitride, boron carbide, glass, basalt or mineral wool, or mixtures thereof.

11 Claims, 1 Drawing Sheet

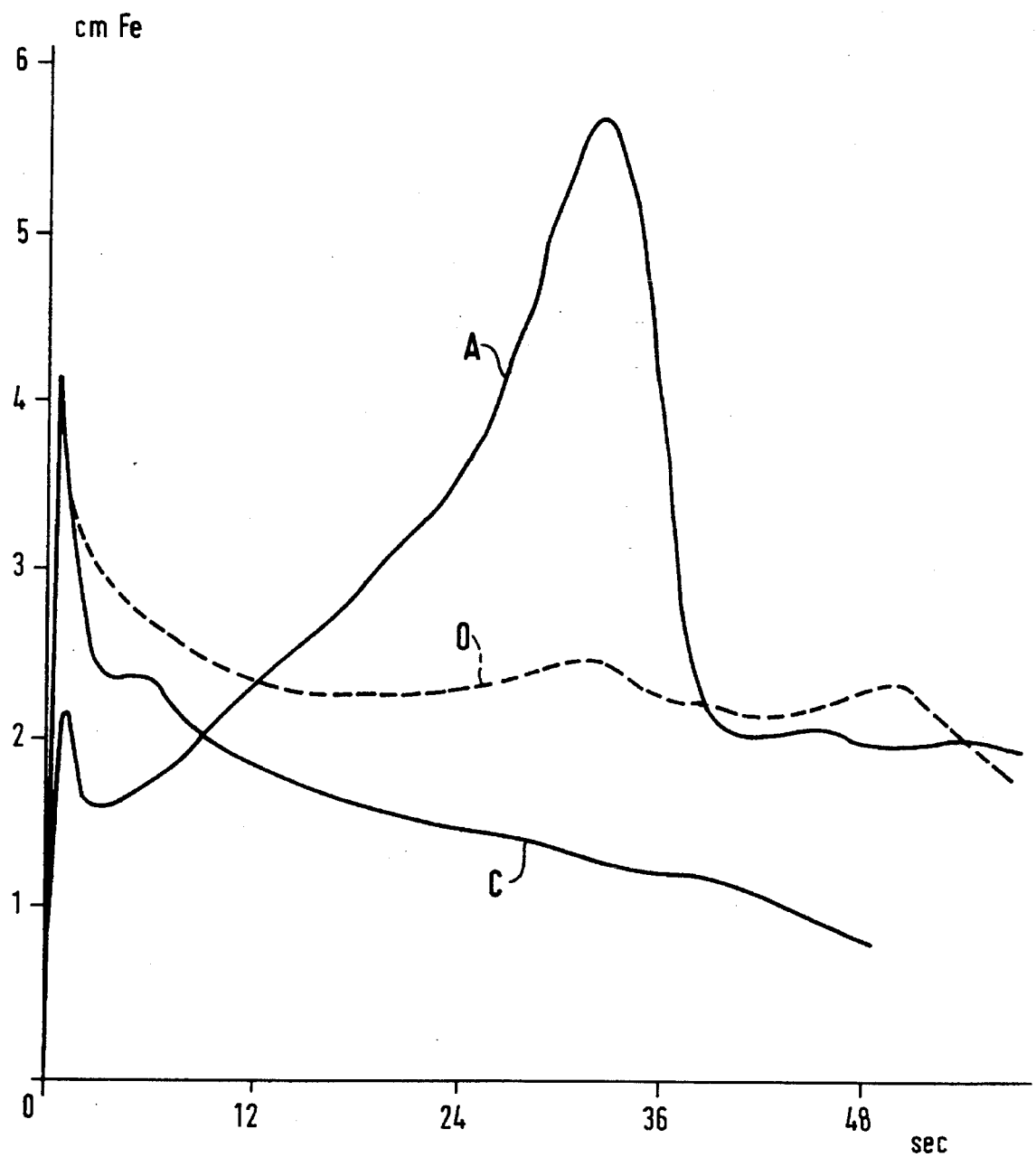

BLACK WASH FOR PRODUCING MOULD COATINGS

CROSS REFERENCE TO RELATED APPLICATION

This is a 371 of international application No. PCT/DE94/00555, filed May 17, 1994.

The invention relates to a refractory wash or generally to a mould coating material which is used in foundry work for coating shaped foundry parts such as moulds, cores and patterns.

Ready-to-use refractory washes are suspensions of finely divided refractory to highly refractory inorganic materials in a carrier liquid, which are applied to the shaped parts by an application method matched to the particular case, for example by painting, spraying, casting or dipping, dry there and thus form the desired coating.

The finely divided refractory to highly refractory inorganic materials are the components of a refractory wash which determine its function in foundry work. They are also described as "base materials" and are suspended in the carrier liquid with the aid of suspension agents. The carrier liquid also contains dissolved binders which serve to fix the base-material particles on the surface of the shaped part after removal of the liquid. If necessary, wetting agents, antifoaming agents and bactericides can also be included.

Typical examples of base materials include (individually or in admixture with another) mineral oxides such as corundum, magnesite, mullite, quartz and chromite, furthermore silicates such as zirconium silicate, olivine and chamotte and also coke and graphite. The suspension agents used are swellable sheet silicates or cellulose derivatives which are capable of incorporating water. The carrier liquid can be water or a solvent such as petroleum ether, methanol, ethanol, isopropanol or isobutanol, and suitable binders are starch derivatives such as dextrins, lignin derivatives such as lignosulphonates, natural resins, synthetic resins or synthetic polymers such as PVA, the binders being selected according to their solubility in the carrier liquid.

The refractory washes are supposed to fulfil the following functions in foundry work:

1. Improvement of the smoothness of the casting surface.
2. Clean separation of liquid metal and shaped part.
3. Avoidance of surface defects such as, for example, gas bubbles, blade ribs, scabs, penetration or burning-in.
4. Influencing the surface zone of the casting by metallurgically active materials.

The functions 1 and 2 can generally be fulfilled well by the combination of various suitable base materials, and the function 4 is only a fringe area since metallurgically active refractory washes, for example containing sulphur, are only sometimes used. However, the function 3 still requires action.

The function 3 is of increasing importance, today and in the future, because all sand moulds and cores bonded with synthetic resin tear open at high temperature as a result of the expansion of the sand, and the melt then penetrates into the mould or the core. The removal of the resulting surface flaws from the casting is very difficult and time-consuming.

Mould coating materials which counteract these defects have already been developed and used, and are described, for example, in the references J. Levelink, *Gießerei*, volume 66, 1979, pp. 456–458 and D. Bartsch, *Report of Technical Forums*, 58th World Foundry Congress, Krakow 1991.

The mode of action of such coatings is based on the use as base material of platelet-shaped sheet silicates, such as kaolinite, pyrophyllite, talc and mica, which can be more readily deformed under the action of a tensile stress. In addition, the mineral materials are combined in such a way that temporary softening phases are formed, which likewise improves the ductility of the coating.

However, a disadvantage which has been found is that these coatings have a very dense texture and thus do not have sufficient permeability for gases which are formed in the thermal decomposition of the binders of the sand moulds. This results in a high gas pressure being built up in the mould and/or in the core, which pressure, as soon as it exceeds the metallostatic counterpressure, leads to boiling of the metal and to gas bubbles. In addition, the pressure rise can also make parts of the coating flake off, which pieces then again occur as inclusions in the casting.

BRIEF DESCRIPTION OF THE DRAWING

The attached figure shows the gas pressure curve of a coldbox core coated with a coating material of a conventional composition (refractory wash A) in comparison with an uncoated core (O) and a coating material of the invention (refractory wash c).

DESCRIPTION OF THE INVENTION

It is an object of the invention to now provide an improved refractory wash which avoids the abovedescribed deficiencies and, while maintaining unchanged good foundry properties, allows the production of coatings having a high gas permeability. This object is achieved according to the invention by the refractory wash having, in addition to the finely divided or platelet-shaped base material, a content of inorganic, hollow spheres, namely in an amount of 1–40% by weight, based on the ready-to-use refractory wash.

For the purposes of the present invention, "inorganic hollow spheres" are small gas-filled hollow spheres having a diameter in the order of 5–500 μm (preferably 60–250 μm), the shell of which is composed of silicates, in particular of aluminium, calcium, magnesium and/or zirconium, of oxides such as aluminium oxide, quartz, magnesite, mullite, chromite, zirconium oxide and/or titanium oxide, of borides, carbides and nitrides such as silicon carbide, titanium carbide, titanium boride, boron nitride and/or boron carbide, of carbon, glass or else metals such as, for example, copper, and the gas filling of which is normally a mixture of inert gases, for example composed of 70% of $CO_2$ and 30% of $N_2$. These hollow spheres have been recently developed and are used, in particular, as light fillers in plastics.

A very high content of hollow spheres in the refractory wash can possibly give reduced strength of the coatings formed. To counteract this, it is proposed, in further pursuit of the inventive concept, that a small amount of thin short fibres be added, in addition to the hollow spheres, to the refractory wash. Such fibres are ones having a diameter of 1–30 μm (preferably 3–10 μm) and a length of 10–5000 μm (preferably 100–500 μm), with inorganic fibres, for example of aluminium silicates, zirconium oxide, aluminium oxide, titanium oxide, carbon, silicon carbide, titanium carbide, titanium boride, boron nitride, boron carbide, glass, basalt and mineral wool being able to be used in the same way as fibres of organic material. The organic fibres can be synthetic fibres of all types or natural fibres such as, for example, cellulose fibres.

DE-C 35 25 847 and DE-C 42 03 904 disclose the provision of refractory washes with a content of fibres to achieve a short drying time without crack formation and an increased flexural strength of the coatings, where, according to DE-C 42 03 904, an increased gas permeability is achievable by means of organic fibres in particular.

However, in comparison with hollow spheres, fibres have the considerable disadvantage that they cannot be introduced without problems into refractory washes and also that the processibility of such refractory washes is poorer. Thus, high shear forces are required in the introduction of fibres to ensure a sufficiently uniform distribution, since fibres tend to form balls. In addition, smooth application is hardly possible in the processing of fibre-containing refractory washes because, for example, on painting the fibres are drawn along by the bristles of the brush. For this reason, only small amounts of fibres are used in the invention and then only when sufficient strength of the coating cannot be achieved in any other way.

It has been found that the gas permeability of refractory wash coatings can be considerably improved without impairing the desired foundry properties, if the refractory wash contains a proportion of these hollow spheres, optionally with the addition of small amounts of fibre materials. This succeeds in eliminating the deficiencies described in the introduction without other disadvantages having to be accepted as a result. Owing to their shape, the hollow spheres can be introduced without problems into refractory washes, and the processibility of such refractory washes corresponds to that of conventional refractory washes; in addition, an advantageously shortened drying time of the coatings could even be found.

Such a result could not have been expected from the previous application area of the hollow spheres, particularly since the property of the hollow spheres as light filler is not of primary importance in a refractory wash. Rather, the small spheres are effective in several other respects. Thus, the dense packing of the base material particles in the coating, which can be looked upon as the main cause for the poor gas permeability, is loosened up by the spheres and this alone makes the coating more permeable to gas. As is shown further below by way of example, a refractory wash having a composition according to the invention in the dry, not yet cast state possesses a significantly improved gas permeability in comparison with a refractory wash without hollow spheres but of otherwise identical composition.

At the beginning of the casting procedure, the insulating properties of the hollow spheres and of the gas-permeable coatings delay the transmission of heat through the refractory wash into the mould material. Later the hollow spheres melt in the heat of casting and/or break under the casting pressure, which results in the formation in the refractory wash coating of numerous micro-flaws which give the coating an extraordinarily high gas permeability without making it permeable to the casting metal.

An advantageous side effect of the melting and/or breaking of the hollow spheres is, in addition, that the inert gas filling of the spheres is liberated and assumes a protective gas function which protects the metal surface against oxidation.

The invention can be used universally for all types of refractory washes. It is of particular importance for those refractory washes which contain platelet-shaped base material particles, and is almost indispensable for the practical utility of such refractory washes. The advantages of the invention are useful even for other refractory washes, since even the finely divided base material particles of conventional refractory washes can pack relatively densely because the particles mostly have an angular to splinter-like shape.

In summary, the invention provides a refractory wash which is suitable for all purposes, and allows, with the aid of fibres and hollow spheres or of hollow spheres alone, the gas permeability and mechanical strength of the coatings to be matched to the requirements of the casting processes, while increasing the drying rate and maintaining good ductility and smooth surfaces.

The following examples illustrate the invention.

EXAMPLES A–D AS IN TABLE 1

The four aqueous refractory washes below were prepared, these having a different content of hollow spheres and optionally of fibres with an otherwise identical composition:

|  | Hollow spheres | Fibres |
| --- | --- | --- |
| Refractory wash A | None | None (Comparative Example) |
| Refractory wash B | 10% by weight | None |
| Refractory wash C | 5% by weight | 1% by weight |
| Refractory wash D | 10% by weight | 1% by weight |

EXAMPLES E–G AS IN TABLE 2

The three alcohol-based refractory washes below were prepared in a similar way to Examples A–D:

|  | Hollow spheres | Fibres |
| --- | --- | --- |
| Refractory wash E | None | None (Comparative Example) |
| Refractory wash F | 10% by weight | None |
| Refractory wash G | 4% by weight | 1% by weight |

In all cases the hollow spheres used were ones of aluminium silicate in which 80% of the particles had a size between 250–90 μm. The fibres were aluminium silicate fibres having an average diameter of 3 μm and a length of <3 mm. To test the gas permeability, the refractory washes A–F were applied to mesh supports, and their gas permeability was then determined using a Georg Fischer testing apparatus by pressing in air at the prescribed pressure through the samples and measuring the amount of air which had passed through in the time unit.

The measured results are given in Tables 1 and 2 as relative values, using the refractory wash A as the basis. It can be seen that the relative gas permeability of all the refractory washes of the invention is significantly above 1, i.e. significantly improved in comparison with the refractory wash A. Thus, for example, the gas permeability of the refractory wash coating rises by 280% on addition of 10% of aluminium silicate hollow spheres (refractory wash B). The process properties of this refractory wash are good. With the further addition of 1% of ceramic fibres (refractory wash D), the refractory wash layer has good strength on cores bonded with synthetic resin. Comparable increases in the gas permeability are observed in the alcohol-based refractory washes F and G. The fact that the gas permeability of the refractory wash layers as a result of the use according to the invention of the hollow sphere/hollow spheres and fibre materials is also observed in the casting behaviour.

The determination of the gas pressure was carried out using cylindrical coldbox cores which were immersed in an iron melt at about 1430° C. The gas pressure produced in the core was measured as a function of the immersion time and is given in centimeters iron column. For the coated core, after an initial maximum there is also a second gas pressure maximum at a later point in time, while for the uncoated core only an initial maximum and two further relatively small pressure maxima are observed. (The uncoated core has the highest possible maximum gas permeability).

With respect to refractory wash C, only a high initial pressure maximum is observed. Here there is no longer any build-up of a high gas pressure at the critical points in time during casting and solidification. The abovedescribed defects such as gas bubbles and inclusions in the casting do not occur.

In the evaluation of surfaces of castings in respect of the specified requirements of refractory washes (items 2 and 3), the refractory washes of the invention give an excellent result. The advantages in the use of hollow spheres or hollow spheres and fibres in refractory washes can be attributed to the relevant properties of the hollow spheres in the casting process.

TABLE 1

Aqueous refractory washes containing various amounts of hollow spheres/fibres

| Refractory wash Substance (proportion in % by weight) | A | B | C | D |
|---|---|---|---|---|
| Water | 50.3 | 40.3 | 44.3 | 39.3 |
| Al silicates | 39.0 | 39.0 | 39.0 | 39.0 |
| Graphite | 4.0 | 4.0 | 4.0 | 4.0 |
| Clay mineral | 4.0 | 4.0 | 4.0 | 4.0 |
| Iron oxide | 1.0 | 1.0 | 1.0 | 1.0 |
| Dextrins | 0.65 | 0.65 | 0.65 | 0.65 |
| Wetting agent | 0.8 | 0.8 | 0.8 | 0.8 |
| Preservative | 0.25 | 0.25 | 0.25 | 0.25 |
| Fibres | 0 | 0 | 1 | 1 |
| Hollow spheres | 0 | 10 | 5 | 10 |
|  | 100% | 100% | 100% | 100% |
| Relative gas permeability (based on refractory wash A) | 1 | 3.8 | 3.4 | 5.7 |

TABLE 2

Alcohol-based refractory washes containing various amounts of hollow spheres/fibres

| Refractory wash Substance (proportion in % by weight) | E | F | G |
|---|---|---|---|
| Alcohol | 49.5 | 49.5 | 49.5 |
| Al silicates | 38.4 | 28.4 | 33.4 |
| Water | 6.2 | 6.2 | 6.2 |
| Bentonite | 3.1 | 3.1 | 3.1 |
| Iron oxide | 2 | 2 | 2 |
| Synthetic resin | 0.8 | 0.8 | 0.8 |
| Fibres | 0 | 0 | 1 |
| Hollow spheres | 0 | 10 | 4 |
|  | 100% | 100% | 100% |

TABLE 2-continued

Alcohol-based refractory washes containing various amounts of hollow spheres/fibres

| Refractory wash Substance (proportion in % by weight) | E | F | G |
|---|---|---|---|
| Relative gas permeability (based on refractory wash A) | 1.2 | 13.8 | 6.8 |

We claim:

1. A refractory wash for producing mould coatings, said wash having improved gas permeability and comprises:
   a carrier liquid;
   finely divided inorganic platelet-shaped refractory materials; and
   inorganic gas-filled hollow spheres, wherein said inorganic spheres are present in an amount of from 1 to 40% by weight based upon the weight of the refractory wash.

2. A refractory wash as in claim 1, wherein said hollow spheres comprise silicates, oxides, borides, carbides, nitrides, carbon, glass, metals or mixtures thereof.

3. A refractory wash as in claim 2, wherein said silicates are selected from the group consisting of aluminum, calcium, magnesium and zirconium, silicate; said oxides are selected from the group consisting of aluminum oxide, quartz, magnesite, mullits, chromite, zirconium oxide and titanium oxide; said borides, carbides and nitrides are selected from the group consisting of silicon carbide, titanium carbide, titanium boride, boron nitride and boron carbide.

4. A refractory wash as in claim 1, wherein said inorganic gas-filled hollow spheres have a diameter of 1–500 μm.

5. A refractory wash as in claim 1, wherein said inorganic gas-filled hollow spheres have a diameter of 60–250 μm.

6. A refractory wash as in claim 1, further comprising inorganic or organic fibers in an amount of 0.1–10% by weight, based on the refractory wash material.

7. A refractory wash as in claim 6, wherein said fibers are inorganic fibers comprising aluminum silicates, aluminum oxide, zirconium oxide, titanium oxide, carbon, silicon carbide, titanium carbide, titanium boride, boron nitride, boron carbide, glass, basalt, mineral wool, or mixtures thereof.

8. A refractory wash as in claim 6, wherein said fibers are organic fibers selected from the group consisting of cellulose, nylon, polyethylene, vinyl acetate and polyester, and mixtures thereof.

9. A refractory wash as in claim 6, wherein said fibers have a diameter of 1–30 μm and a length of 10–5000 μm.

10. A refractory wash as in claim 6, wherein said fibers have a diameter of 3–10 μm and a length of 100–500 μm.

11. A refractory wash for producing mould coatings, said wash comprising:
    a carrier liquid;
    finely divided inorganic refractory materials; and
    inorganic gas-filled hollow spheres, wherein said inorganic spheres are present in an amount of from 1 to 40% by weight based upon the weight of the refractory wash and have a diameter of 1–500 μm.

* * * * *